(12) United States Patent
Balla et al.

(10) Patent No.: US 9,199,585 B2
(45) Date of Patent: Dec. 1, 2015

(54) VEHICLE PANEL ASSEMBLY

(71) Applicant: Nissan North America, Inc., Franklin, TN (US)

(72) Inventors: Chaitanya Sagar Balla, Plymouth, MI (US); Ronald Senakiewich, Royal Oak, MI (US); Christopher Biggs, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 134 days.

(21) Appl. No.: 13/902,196

(22) Filed: May 24, 2013

(65) Prior Publication Data

US 2014/0346799 A1 Nov. 27, 2014

(51) Int. Cl.
*B60R 13/02* (2006.01)

(52) U.S. Cl.
CPC ......... *B60R 13/0206* (2013.01); *B60R 13/0243* (2013.01); *B60R 2013/0293* (2013.01)

(58) Field of Classification Search
CPC ............ B60R 13/0206; B60R 13/0243; B60R 2013/0293; B60R 2013/0281
USPC ....................................................... 296/1.08
See application file for complete search history.

(56) References Cited

U.S. PATENT DOCUMENTS

| 5,529,370 | A | 6/1996 | Veit |
| 6,098,940 | A | 8/2000 | Jacquemin |
| 8,011,709 | B2 | 9/2011 | Senakiewich, II et al. |
| 8,615,962 | B1 * | 12/2013 | Perez et al. ................... 52/716.7 |
| 8,646,827 | B2 * | 2/2014 | Zimmerman et al. ........... 296/72 |
| 2008/0073924 | A1 * | 3/2008 | Sakamoto ..................... 296/1.08 |
| 2009/0145041 | A1 | 6/2009 | Yamada et al. |

FOREIGN PATENT DOCUMENTS

| JP | 2001-253286 A | 9/2001 |
| JP | 2006-151288 A | 6/2006 |
| JP | 2008-149896 A | 7/2008 |

* cited by examiner

*Primary Examiner* — Glenn Dayoan
*Assistant Examiner* — Melissa A Black
(74) *Attorney, Agent, or Firm* — Global IP Counselors, LLP

(57) ABSTRACT

A vehicle panel assembly includes a first panel, a second panel and a retaining element. The first panel has a first side and a second side with at least one aperture extending from the first side to the second side. The second panel overlies a portion of the first side of the first panel. The second panel includes at least one snap-fitting member extending through the at least one aperture and contacting an area of the second side adjacent to the at least one aperture. The retaining element includes at least one restricting part that extends from the second side of the first panel into the at least one aperture to restrict movement of the snap-fitting member and inhibit disengagement of the snap-fitting member with the area of the second side adjacent to the at least one aperture.

20 Claims, 12 Drawing Sheets

VEHICLE PANEL ASSEMBLY

BACKGROUND

1. Field of the Invention

The present invention generally relates to a vehicle panel assembly. More specifically, the present invention relates to a vehicle panel assembly including panels that attach to one another via snap-fitting connections and a retaining member that securely retains snap-fitting members of one of the panels in an installed orientation.

2. Background Information

In recent years, vehicles are being designed to include interior trim panels that are attached to related vehicle structures with snap-fitting members. Such snap-fitting members are fairly reliable and provide a simple way to install trim panels without the need for expensive tooling. Similarly, it is relatively easy to remove an interior trim panel that was installed using snap-fitting members.

SUMMARY

One object of the disclosure is to provide a snap-fitting arrangement with a first panel having at least one aperture, a second panel having at least one snap-fitting member installed into the aperture and a separate retaining member that prevents removal of the snap-fitting member from the aperture.

Another object of the disclosure is to provide a snap-fitting arrangement with a first panel having at least one aperture, a second panel having at least one snap-fitting member installed into the aperture and a separate retaining member that includes a projection extending into the aperture alongside the snap-fitting member preventing movement of the snap-fitting member relative to the aperture.

In view of the state of the known technology, a vehicle panel assembly is provided with a first panel, a second panel and a retaining member. The first panel has a first side and a second side with at least one aperture extending from the first side to the second side. The second panel overlies a portion of the first side of the first panel. The second panel includes at least one snap-fitting member extending through the at least one aperture and contacting an area of the second side adjacent to the at least one aperture. The retaining element includes at least one restricting part that extends from the second side of the first panel into the at least one aperture to restrict movement of the snap-fitting member and inhibit disengagement of the snap-fitting member with the area of the second side adjacent to the at least one aperture.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
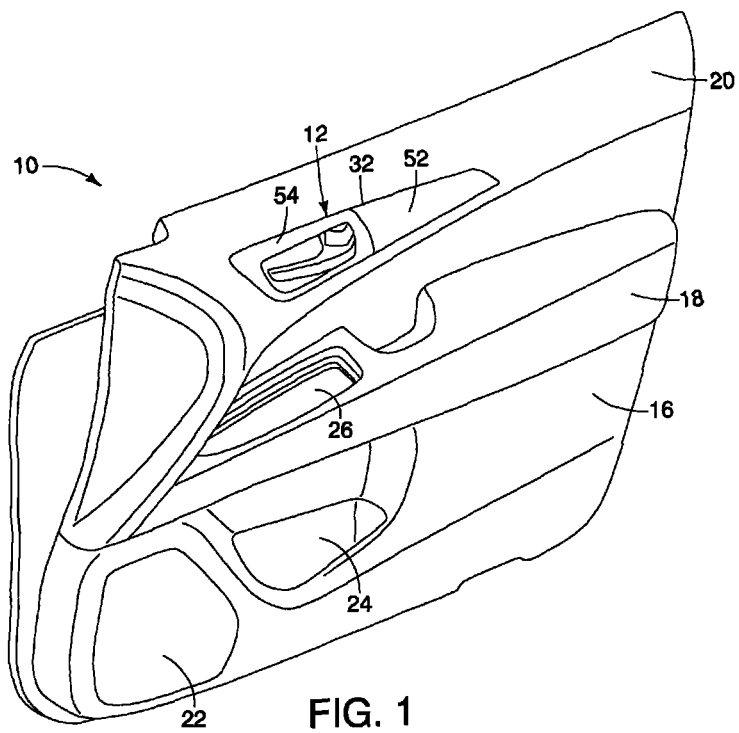
FIG. 1 is a perspective view of a vehicle door trim assembly shown removed from a vehicle door, showing a lower pocket section, an arm rest section and an upper section that includes a panel assembly in accordance with various embodiments.
Figure 2:
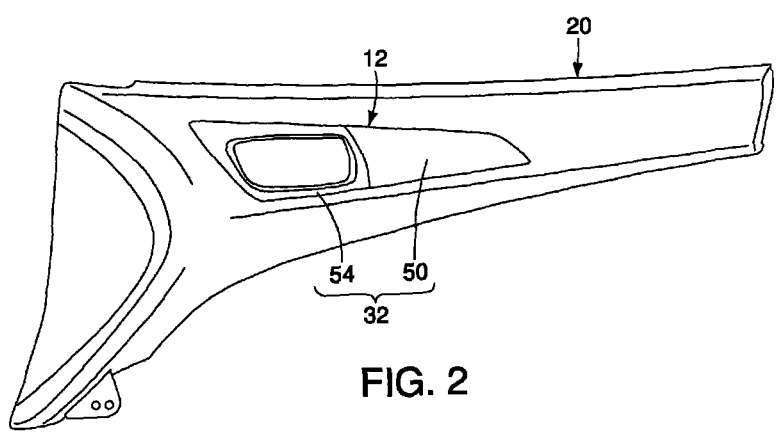
FIG. 2 is an elevational view of the upper section shown removed from of the vehicle door trim assembly in accordance with the various embodiments.

Referring initially to FIG. 1, a vehicle door trim assembly 10 including a panel assembly 12 is illustrated in accordance with a first embodiment. A description of the panel assembly 12 is provided below after a brief description of the vehicle door trim assembly 10.

As shown in FIG. 1, the vehicle door trim assembly 10 includes a plurality of differing sections, such as a lower pocket section 16, an arm rest section 18 and an upper section 20. The lower pocket section 16 includes a speaker retaining area 22 and a pocket 24 for storage of convenience items for use by a passenger or a driver of a vehicle equipped with the vehicle door trim assembly 10. The arm rest section 18 can include a small control panel area 26 that can be fitted with conventional window and lock control switches. The upper section 20 includes a contoured surface as per the design of a door to be provided with the vehicle door trim assembly 10 and a section hereinafter referred to as a first panel 30 (shown in FIGS. 3, 4 and 5) that is described in greater detail below.

The lower pocket section 16, the arm rest section 18 and the upper section 20 can be manufactured in any of a variety of ways. For example, the lower pocket section 16, the arm rest section 18 and the upper section 20 can be manufactured as separate elements attached to a backer panel (not shown) or attached separately to an interior surface of a vehicle door (not shown). Alternatively, the lower pocket section 16, the arm rest section 18 and the upper section 20 can be integrally formed as a single monolithic unit, with openings that are configured to retain, for example, the speaker retaining area 22, the pocket 24 and the conventional window and lock control switches. The appearance and surface textures of the lower pocket section 16, the arm rest section 18 and the upper section 20 can vary from vehicle to vehicle. For example, any or all of the lower pocket section 16, the arm rest section 18 and/or the upper section 20 can include a leather, leather-like or textile covering. However, the first panel 30 of the upper section 20 is an unadorned portion of the upper section 20 and does not include any decorative covering, since it is designed to receive elements of the panel assembly 12, as is explained in greater detail below.

It should be understood from the drawings and the description herein that the appearance and surface contours depicted in the drawings of the lower pocket section 16, the arm rest section 18 and the upper section 20 do not limit the invention. Rather, the appearance and surface contours of the lower pocket section 16, the arm rest section 18 and the upper section 20 can be aesthetically and functionally altered in any of a variety of differing ways and still encompass the invention described hereinbelow.

A description of the panel assembly 12 is now provided with reference to FIGS. 2 thru 13. The panel assembly 12 basically includes the first panel 30 of the upper section 20 (FIGS. 3, 4 and 5), a second panel 32 (FIGS. 2, 3, 4 and 6-10) and a retaining element 34 (FIGS. 3 and 10-13).

The second panel 32 is shaped and configured to attach to the first panel 30 of the upper section 20. It should be understood from the drawings and the description herein, that the general shapes and relative dimensions of the elements of the first panel 30 and the second panel 32 of the panel assembly 12 depicted in the drawings are not intended to limit the invention. Rather, the first panel 30 and the second panel 32 represent one example of a variety of shapes and contours that can be used in the application of the panel assembly 12 with the retaining element 34, as is made clearer in the description below.

Figure 3:
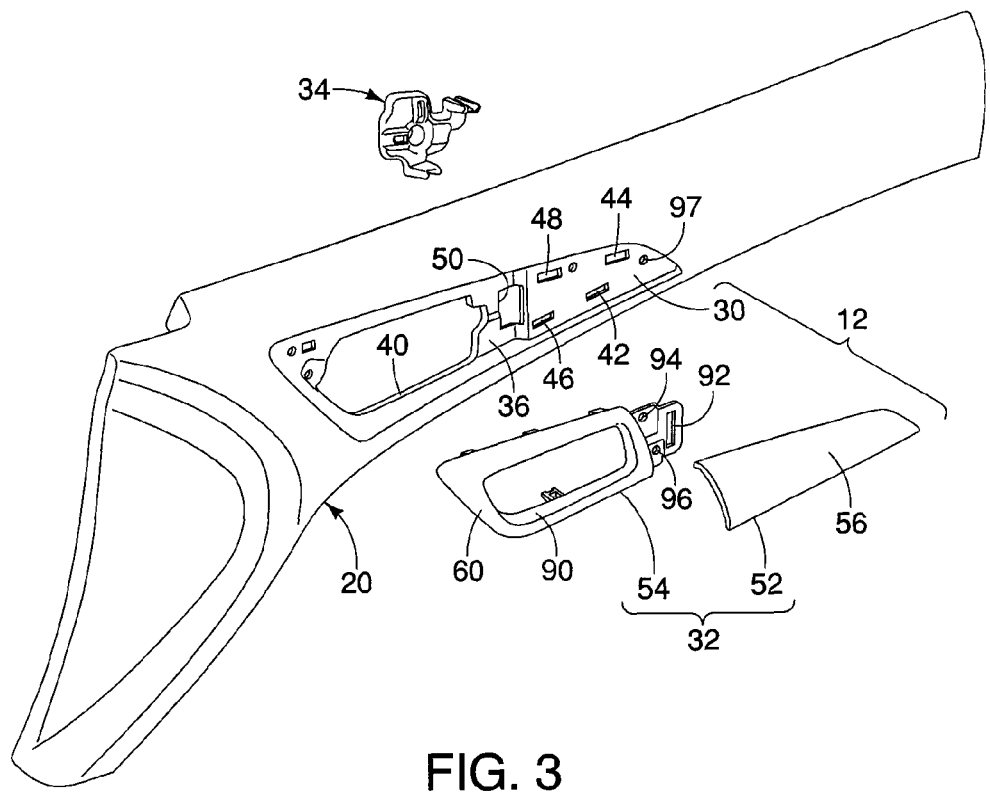
FIG. 3 is an exploded view of the upper section of the vehicle door trim assembly showing details of the panel assembly, including a first side of a first panel of the upper section, a second panel having first and section sections, and a retaining element in accordance with a first embodiment.
Figure 4:
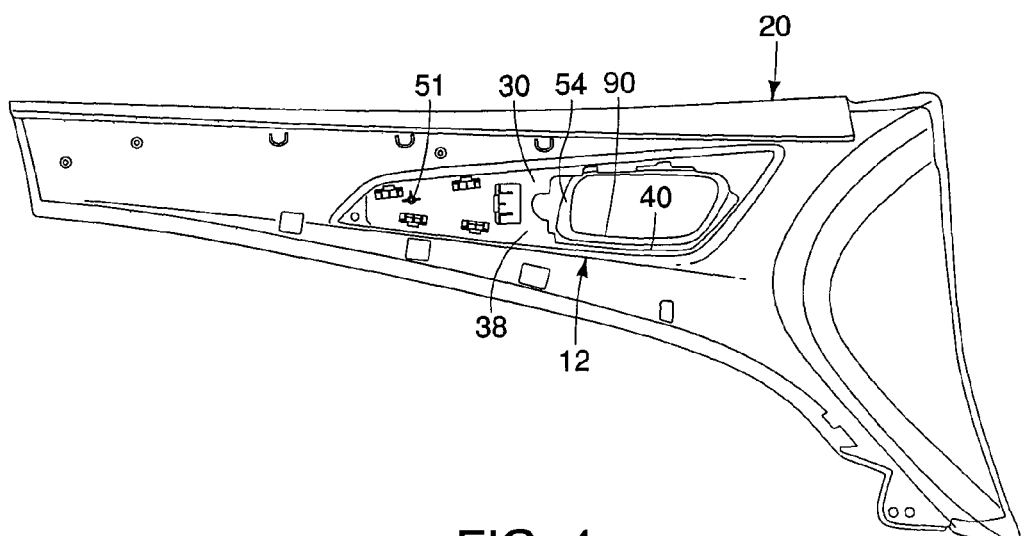
FIG. 4 is a plan view of the upper section showing a second side of the first panel in accordance with the first embodiment.
Figure 5:
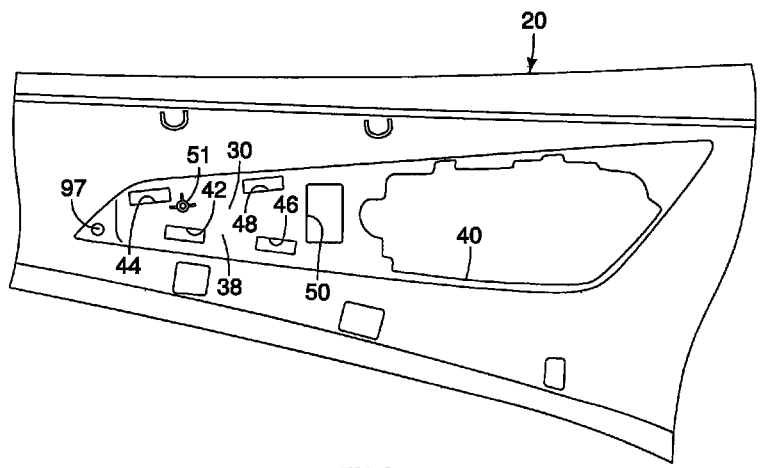
FIG. 5 is another plan view of a portion of the upper section, showing further detail of the first panel in accordance with the first embodiment.

A description of the first panel 30 of the upper section 20 is now provided with reference to FIGS. 3, 4 and 5. The first panel 30 is a generally flat area of the upper section 20 that has no decorative covering. The first panel 30 is designed to support separate elements, such as the second panel 20 and the retaining element 34. The first panel 30 has a first side 36 (FIG. 3) and a second side 38 (FIGS. 4 and 5). As shown in FIG. 5, the first panel 30 includes a main opening 40 and a plurality of slots or apertures 42, 44, 46, 48 and 50. Each of the apertures 42, 44, 46, 48 and 50 extends from the first side 36 to the second side 38 of the first panel 30. The apertures 42, 44, 46, 48 and 50 are arranged with predetermined spacing therebetween defining a spacing pattern. The second side 38 also includes an attachment post 51 with a central aperture that is configured to receive a threaded fastener as is described in greater detail below.

Figure 7:
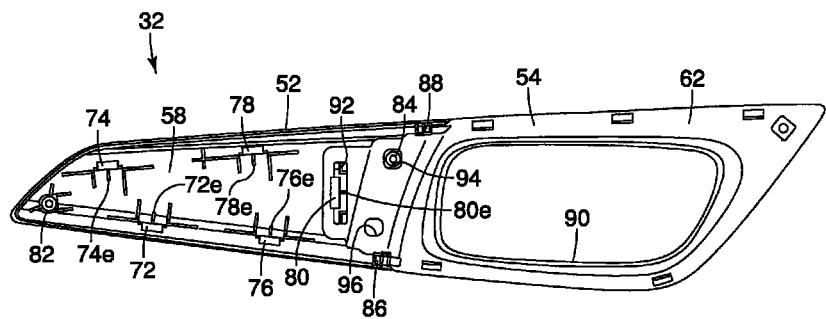
FIG. 7 is a plan view of the first and second sections of the second panel shown attached to one another in accordance with the first embodiment.

The second panel 32 includes a first section 52 and a second section 54. However, the second panel 32 can alternatively constitute a single panel section that attaches to the first panel 30 in a manner described below. The first section 52 of the second panel 32 includes a decorative surface 56 and an attachment surface 58. Similarly, the second section 54 of the second panel 32 includes a decorative surface 60 and an attachment surface 62 (FIG. 7).

The decorative surfaces 56 and 60 can include a wood grain appearance, a chrome appearance, a leather appearance, etc., depending upon the design features of the vehicle, and the decorative features of the lower pocket section 16, the arm rest section 18 and the remainder of the upper section 20. The decorative surface 56 and the decorative surface 60 can have decorative appearances that differ from one another. Since such decorative features are a matter of design choice, further description is omitted for the sake of brevity.

As shown in FIGS. 6-9, the attachment surface 58 of the first section 52 of the second panel 32 includes a plurality of snap-fitting members 72, 74, 76, 78 and 80. The snap-fitting members 72, 74, 76, 78 and 80 are arranged with predetermined spacing therebetween, defining a spacing pattern aligned with the spacing pattern defined by the apertures 42, 44, 46, 48 and 50 of the first panel 30. The attachment surface 58 of the first section 52 can additionally include a pair of attachment posts 82 and 84 each having a central aperture that is configured to receive a threaded fastener. However, in the embodiments described below, the attachment post 84 is used solely as a locating projection. The attachment surface 58 also includes a pair of gripping projections 86 and 88.

Figure 6:
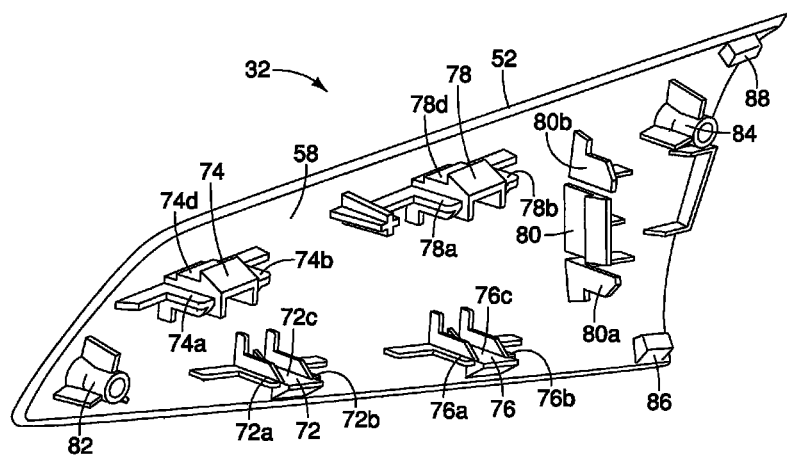
FIG. 6 is a perspective view of the first section of the second panel removed from the first panel and the second section of the first panel, in accordance with the first embodiment.
Figure 9:
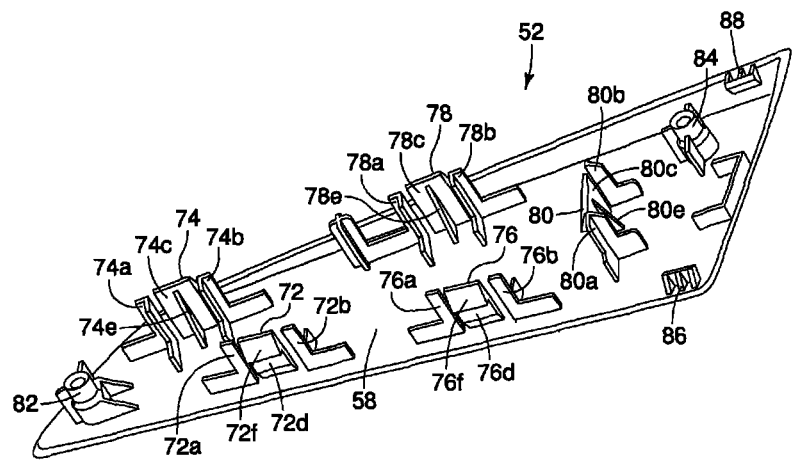
FIG. 9 is another perspective view of the first section of the second panel, from an angle looking upward at the snap-fitting members in accordance with the first embodiment.
Figure 10:
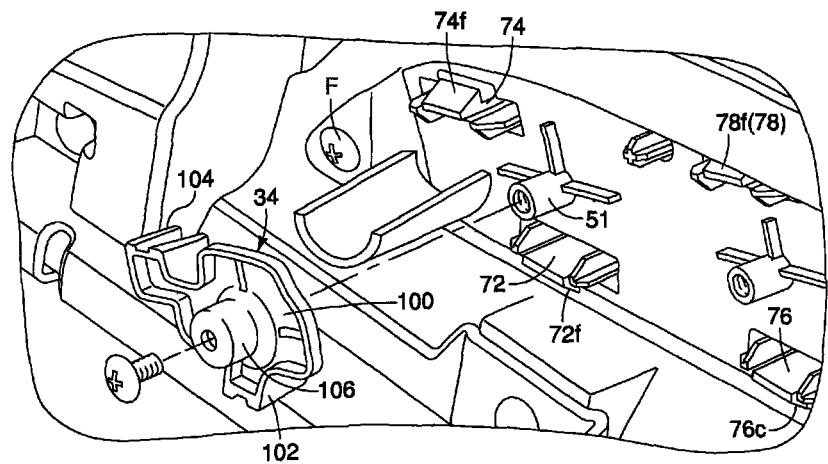
FIG. 10 is an exploded view of the panel assembly showing the second side of the first panel with the snap-fitting members of the second panel extending through apertures in the first panel and the retaining member in accordance with the first embodiment.
Figure 11:
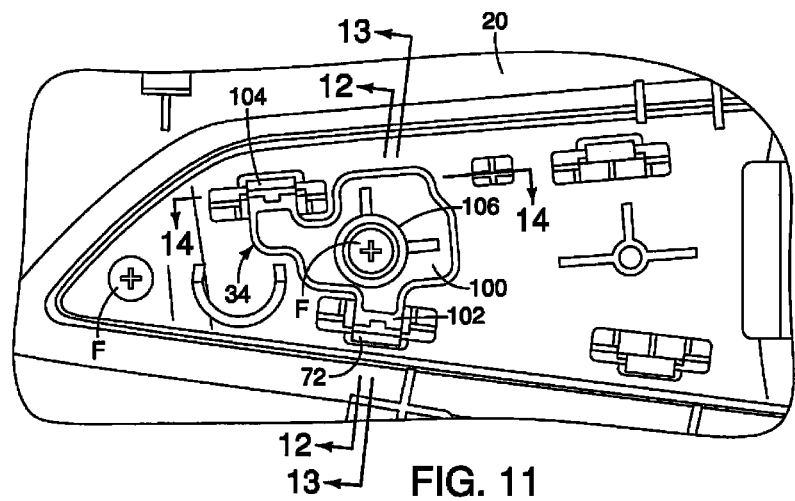
FIG. 11 is a plan view of the second side of the first panel with the retaining member installed to retain a pair of the snap-fitting members of the second panel in position in accordance with the first embodiment.

As shown in FIGS. 6 and 9, each of the plurality of snap-fitting members 72, 74, 76, 78 and 80 includes alignment posts on either lateral side thereof. Specifically, alignment posts 72a and 72b are located at opposite lateral sides of the snap-fitting member 72. Similarly, alignment posts 74a and 74b are located at opposite lateral sides of the snap-fitting member 74; alignment posts 76a and 76b are located at opposite lateral sides of the snap-fitting member 76; and alignment posts 78a and 78b are located at opposite lateral sides of the snap-fitting member 78. Further, alignment posts 80a and 80b are located at opposite lateral sides of the snap-fitting member 80.

The snap-fitting member 72 includes a main portion having a first side surface 72c, a second side surface 72d, a rib 72e and a catch 72f. Similarly the snap-fitting member 74 includes a main portion having a first side surface 74c, a second side surface 74d, a rib 74e and a catch 74f. The snap-fitting member 76 includes a main portion having a first side surface 76c, a second side surface 76d, a rib 76e and a catch 76f. The snap-fitting member 78 includes a main portion having a first side surface 78c, a second side surface 78d, a rib 78e and a catch 78f. Further, the snap-fitting member 80 includes a main portion having a first side surface 80c, a second side surface 80d, a rib 80e and a catch 80f.

Each of snap-fitting members 72, 74, 76, 78 and 80 has a similar geometry and construction. Therefore, description the features of any one of the snap-fitting members 72, 74, 76, 78 and 80 applies to all of the snap-fitting members 72, 74, 76, 78 and 80.

Figure 8:
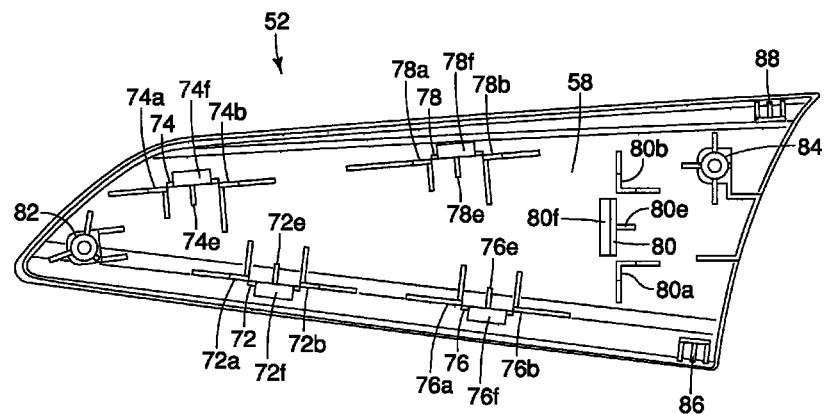
FIG. 8 is a plan view of the first section of the second panel showing details of snap-fitting members in accordance with the first embodiment.
Figures 12, 13:
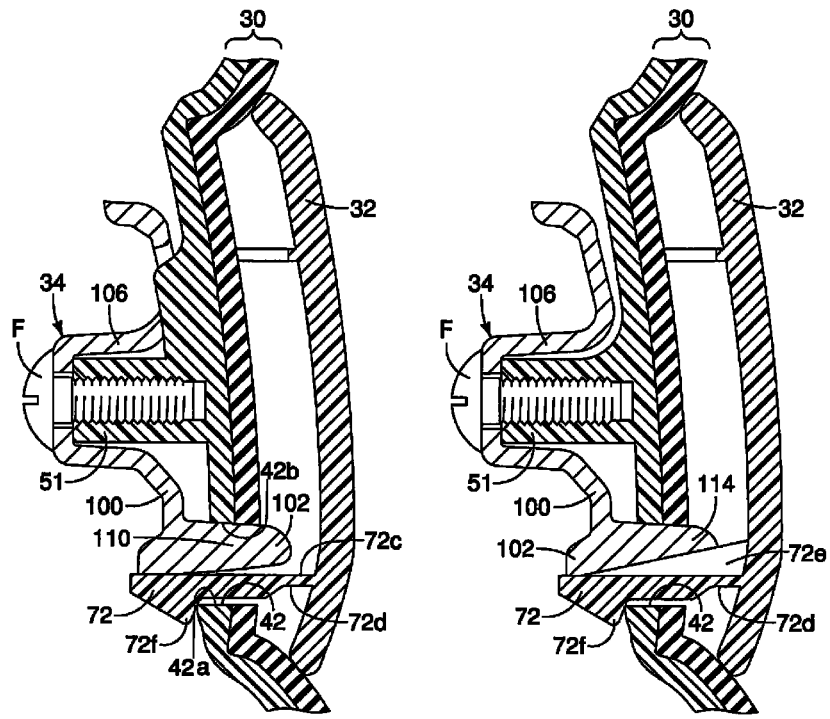
FIG. 12 is a cross-sectional view of the panel assembly taken along the line 12-12 in FIG. 11, showing a first surface of a restricting part of the retaining member restricting movement of one of the snap-fitting members of the second panel in accordance with the first embodiment.
FIG. 13 is another cross-sectional view of the panel assembly taken along the line 13-13 in FIG. 11, showing a second surface of the restricting part of the retaining member restricting movement of one of the snap-fitting members of the second panel in accordance with the first embodiment.

With specific reference to FIGS. 8 and 9, a description of the snap-fitting member 72 is now provided and is applicable to each of the other snap-fitting members 74, 76, 78 and 80. The rib 72e of the snap-fitting member 72 extends along the first side surface 72c of the main portion of the snap-fitting member 72 and extends perpendicular to the first side surface 72c. The edge surface of the rib 72e is angled, defining a wedge-like shape or tapered shape as viewed from the side, as shown in FIG. 13. The catch 72f is located at a free end of the snap-fitting member 72 and extends from the second side surface 72d in a direction opposite from the rib 72e. As mentioned above, the description of the first side 72c, the second side 72d, the rib 72e and a catch 72f, applies to the corresponding features on each of the other snap-fitting members 74, 76, 78 and 80.

As shown in FIG. 3, the second section 54 of the second panel 32 includes an opening 90 that aligns with the opening 40, with the second panel 32 installed to the first panel 30. The opening 90 is dimensioned to receive hardware, such as a door latch mechanism (not shown). The second section 54 of the second panel 32 also includes a slot 92 and apertures 94 and 96.

The first section 52 attaches to the second section 54 of the second panel 32 in a manner described below. In the depicted embodiment, the snap fitting projection 80 and the alignment posts 80a and 80b of the first section 52 are inserted into the opening 90, as shown in FIG. 7. The gripping projections 86 and 88 overlap lower and upper edges of a portion of the second section 54 to maintain alignment of the second section 54 with the first section 52, thereby defining the depicted shape of the second panel 32. The catch 80f contacts the surface of the second section 54, creating a snap-fit engagement between the first section 52 and the second section 54 of the second panel 32.

Thereafter, the entire second panel 32 is installed to the first panel 30 in the following manner. The second panel 32 overlies the first side 36 of the first panel 30 when installed to the first panel 30. The second panel 32 is installed to the first panel 30 such that the snap-fitting member 72 and alignment posts 72a and 72b are inserted into the aperture 42. The alignment posts 72a and 72b are spaced apart from one another by a distance that is approximately the same as the width of the aperture 42. Therefore, the alignment posts 72a and 72b define first and second alignment projections that engage oppositely facing surfaces of the aperture 42. The alignment post 72a (the first alignment projection) therefore restricts movement of the snap-fitting member 72 relative to the first panel 30 in a first direction, and the alignment post 72b (the second alignment projection) restricts movement of the snap-fitting member 72 relative to the first panel 30 in a second direction opposite the first direction and perpendicular to the direction of snap-fitting engagement provided by the catch 72f of the snap-fitting member 72.

Similarly, the snap-fitting member 74 and alignment posts 74a and 74b are inserted into the aperture 44; the snap-fitting member 76 and alignment posts 76a and 76b are inserted into the aperture 46; and the snap-fitting member 78 and alignment posts 78a and 78b are inserted into the aperture 48. Thereafter, the second panel 32 is pushed against the first panel 30 until the catches 72f, 74f, 76f and 78f of the snap-fitting members 72, 74, 76 and 78 are fully inserted into the corresponding apertures 42, 44, 46 and 48. The catches 72f, 74f, 76f and 78f provide snap-fitting engagement between the first panel 30 and the second panel 32 such that each of the catches 72f, 74f, 76f and 78f contact a respective area of the second side 38 of the first panel 30 adjacent to the apertures 42, 44, 46 and 48, respectively. Further, a fastener F is inserted through both an opening 97 in the first panel 30 and the opening 94 into the central apertures of the attachment post 82 in order to further retain the second panel 32.

A description of the retaining element 34 is now provided with specific reference to FIGS. 10-19. The retaining element 34 basically includes an attachment portion 100 and a pair of restricting parts 102 and 104 extending therefrom. The attachment portion 100 includes a cylindrically shaped boss 106 that extends in a direction opposite the restricting parts 102 and 104. The restricting parts 102 and 104 extend in a direction perpendicular to the attachment portion 100. The restricting part 102 and the restricting part 104 are spaced apart from one another and oriented relative to one another in a manner that corresponds to the spacing and orientation between the snap-fitting member 72 and the snap-fitting member 74. The restricting part 102 and the restricting part 104 are also located at opposing edges of the attachment portion 100. Each of the restricting parts 102 and 104 has a wedge shape, as described further below.

The restricting parts 102 and 104 have basically the same shape, dimensions, and contours. Therefore, description of the restricting part 102 applies equally to the restricting part 104. The restricting part 102 (and the restricting part 104) is a projection that includes a first wedge portion 110, a second wedge portion 112 and a mid-portion 114 between the first and second wedge portions 110 and 112. The mid-portion 114 defines a recess with a tapering contour. More specifically, the mid-portion 114 has a tapering thickness as viewed in cross-section, as shown in FIG. 13.

Figure 14:
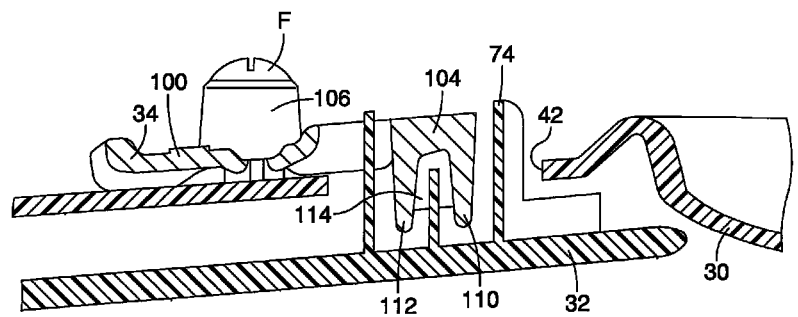
FIG. 14 is another cross-sectional view of the panel assembly taken along the line 14-14 in FIG. 11, showing the restricting part of the retaining member restricting movement of one of the snap-fitting members of the second panel in accordance with the first embodiment.
Figure 15:
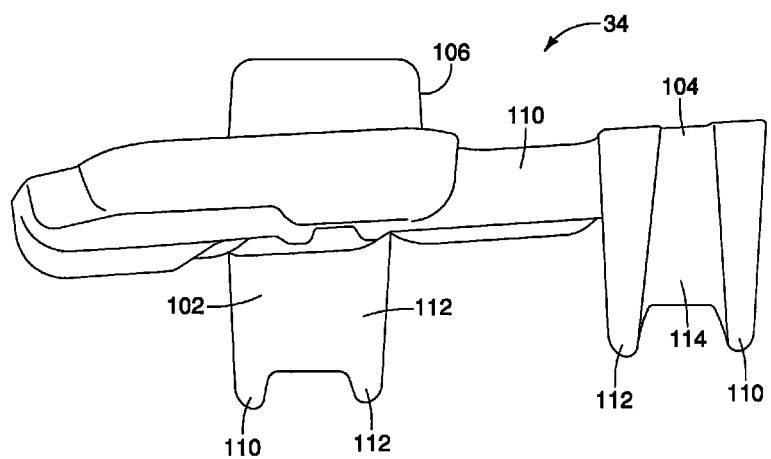
FIG. 15 is a side view of the retaining member shown removed from the panel assembly in accordance with the first embodiment.
Figure 16:
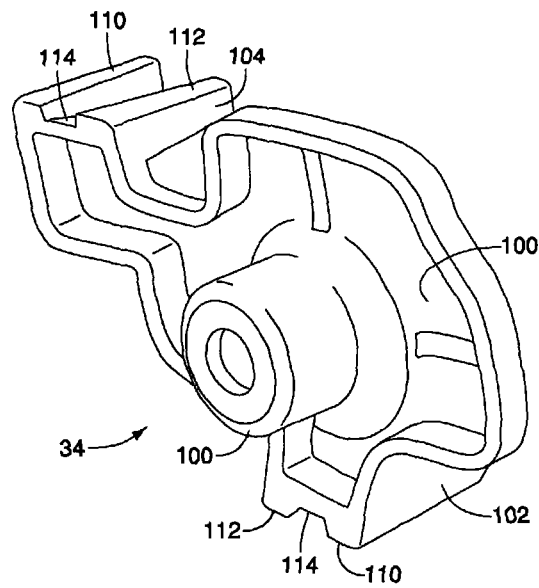
FIG. 16 is a first perspective view of the retaining member showing a first side of the retaining member in accordance with the first embodiment.
Figure 17:
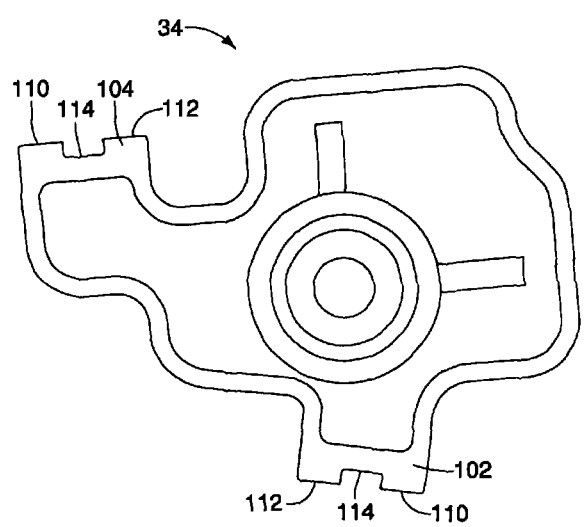
FIG. 17 is a first end view of the retaining member showing the first side of the retaining member in accordance with the first embodiment.
Figure 18:
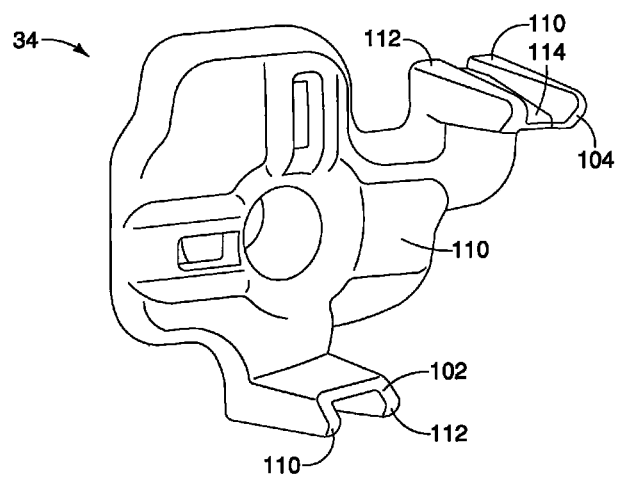
FIG. 18 is a second perspective view of the retaining member showing a second side of the retaining member in accordance with the first embodiment.
Figure 19:
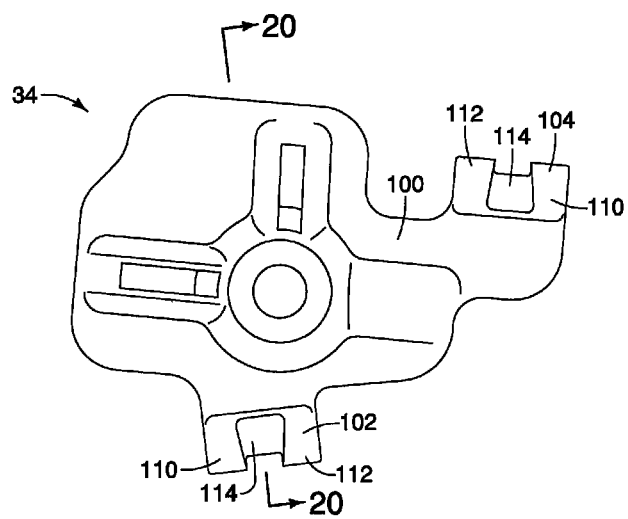
FIG. 19 is a second end view of the retaining member showing the second side of the retaining member in accordance with the first embodiment.
Figure 20:
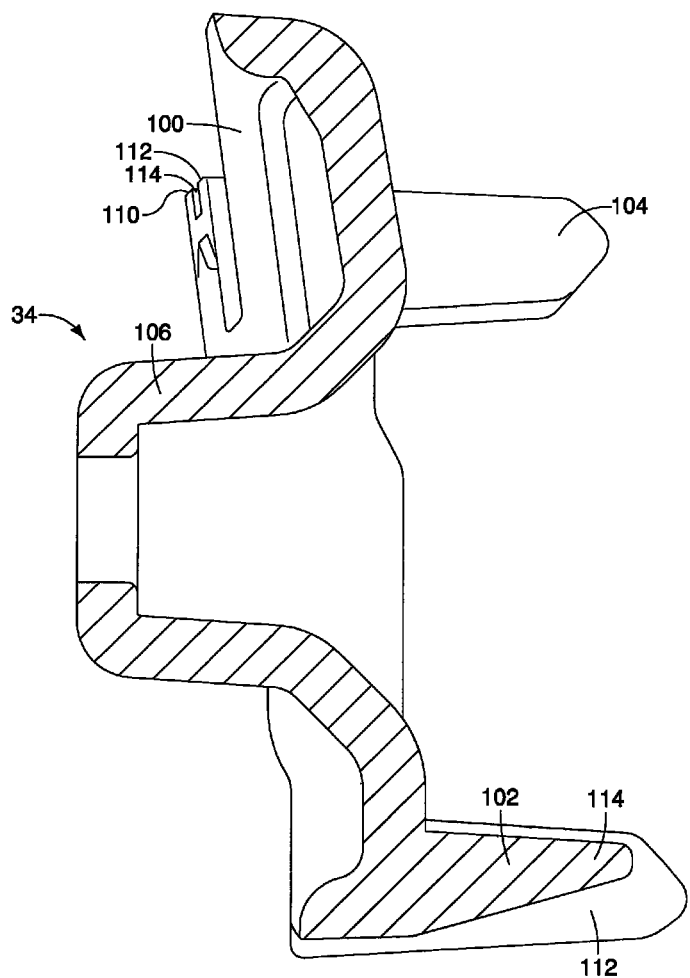
FIG. 20 is a cross-section of the retaining member taken along the line 20-20 in FIG. 19 in accordance with the first embodiment.

After the second panel 32 is installed to the first panel 30, the retaining element is installed in a manner described below. The attachment portion 100 is moved toward the second side 36 of the first panel 30, the restricting parts 102 is inserted into the aperture 42 and the restricting part 104 is inserted into the aperture 44. A fastener F (FIGS. 10-13) is inserted into the central aperture of the cylindrically shaped boss 106 and is threaded into the attachment post 51. As the fastener F is tightened, the restricting parts 102 and 104 are wedged into the apertures 42 and 44, respectively, and contact the first side surfaces 72c and 74c, respectively. More specifically, as shown in FIG. 12, the first wedge portion 110 of the restricting part 102 contacts the first side surface 72c of the snap-fitting member 72. Further, the aperture 42 is defined by a surrounding peripheral edge that includes a first edge portion 42a and a second edge portion 42b, with the second edge portion 42b facing the first edge portion 42a, as shown in FIG. 12. The first wedge portion 110 is wedged between the first side surface 72c of the snap-fitting member 72 and the second edge portion 42b of the aperture 42. Meanwhile, the second side surface 72d of the snap-fitting member 72 is pushed against the first edge portion 42a. As shown in FIG. 13, the mid-portion 114 contacts a surface of the rib 72e. Put another way, the rib 72e extends into the recess defined by the mid-portion 114 between the first wedge portion 110 and the second sedge portion 112, as shown in FIG. 14.

Hence, with the restricting parts 102 and 104 extending from the second side 38 of the first panel 30 into the apertures 42 and 44, the restricting parts 102 and 104 restrict movement of the snap-fitting members 72 and 74. Therefore, the catches 72f and 74f are prevented from disengaging from the area of the second side 38 of the first panel 30 adjacent to the apertures 42 and 44. It should be understood from FIGS. 12 and 13 that the restricting part 102 is wedged between the snap-fitting member 72 and a surface of the first panel 30 that defines the aperture 42. Similarly, the restricting part 104 is wedged between the snap-fitting member 74 and a surface of the first panel 30 that defines the aperture 44. Since the fastener F is removable, the retaining element 34 is also removable.

The panel assembly 12 described above provides a structure that allows for convenient use of snap-fitting attachments, but further ensures a reliable, semi-permanent attachment. Snap-fitting attachments can be detached and panels separated. The retaining element 34 prevents (or at a minimum greatly increases the necessary forces required for) the detachment of the snap-fitting members 72 and 74 from the first panel 30. Thus, a more permanent and reliable attachment arrangement between panels that snap-fit together is achieved.

Second Embodiment

Figure 21:
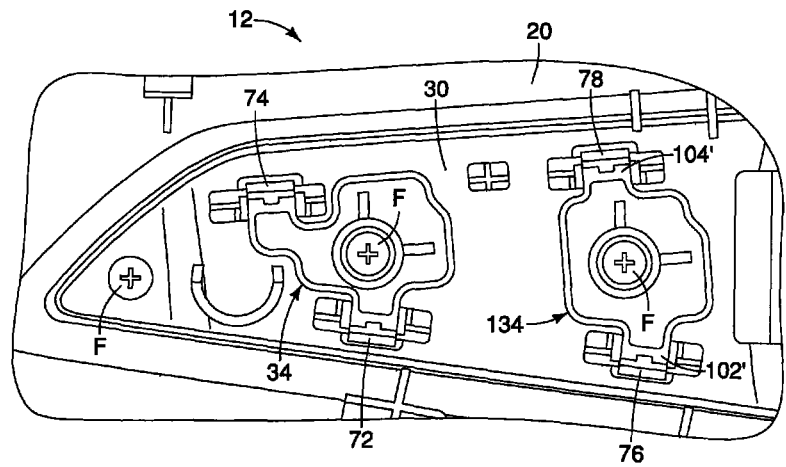
FIG. 21 is a plan view of the second side of the first panel with a first retaining member and a second retaining member installed to retain two pairs of the snap-fitting members of the second panel in position in accordance with a second embodiment.

Referring now to FIG. 21, the panel assembly 12 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the panel assembly 12 is unchanged. Specifically, the panel assembly 12 includes the first panel 30, the second panel 32 and the retaining element 34. However, in the second embodiment, a second retaining element 134 is added. The second retaining element 134 includes a pair of restricting parts 102' and 104' that are essentially the same as the restricting parts 102 and 104 of the retaining element 34. However, the restricting parts 102' and 104' of the second embodiment are oriented and spaced apart from one another such that the restricting parts 102' and 104' are inserted into the apertures 46 and 48 and wedge against the snap-fitting members 76 and 78, respectively.

Third Embodiment

Figure 22:
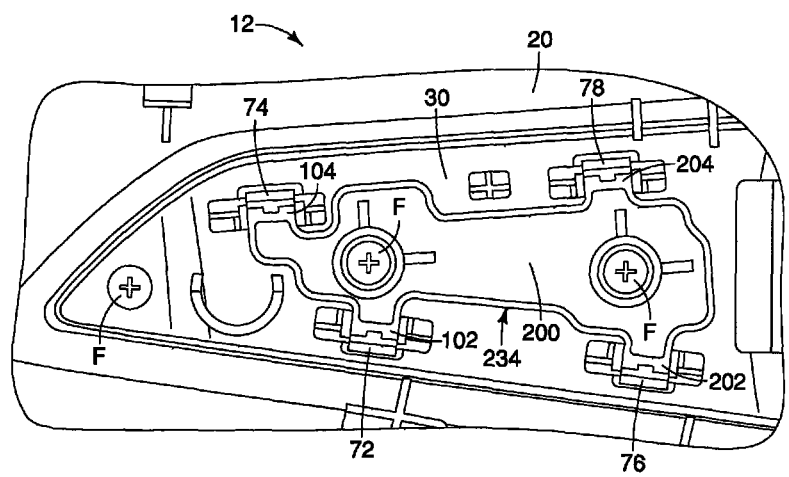
FIG. 22 is a plan view of the second side of the first panel with a single retaining member installed to retain four of the snap-fitting members of the second panel in position in accordance with a third embodiment.

Referring now to FIG. 22, the panel assembly 12 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the first panel 30 and the second panel 32 of panel assembly 12 are unchanged. However, the retaining element 34 is replaced with a retaining element 234. The retaining element 234 includes an attachment portion 200 that is larger than the attachment portion 100 of the retaining element 34 of the first embodiment. The attachment portion 200 includes the restricting parts 102 and 104 of the retaining element 34 of the first embodiment, and also includes two more restricting parts 202 and 204. The restricting parts 102 and 104 are positioned and oriented to install into the apertures 42 and 44 in a manner similar to the first embodiment. The restricting parts 202 and 204 are oriented and spaced apart from one another such that the restricting parts 202 and 204 are inserted into the apertures 46 and 48 and wedge against the snap-fitting members 76 and 78, respectively.

Thus, in the third embodiment, a single retaining element 234 prevents movement of four of the snap-fitting members 72, 74, 76 and 78.

Fourth Embodiment

Figures 23, 24:
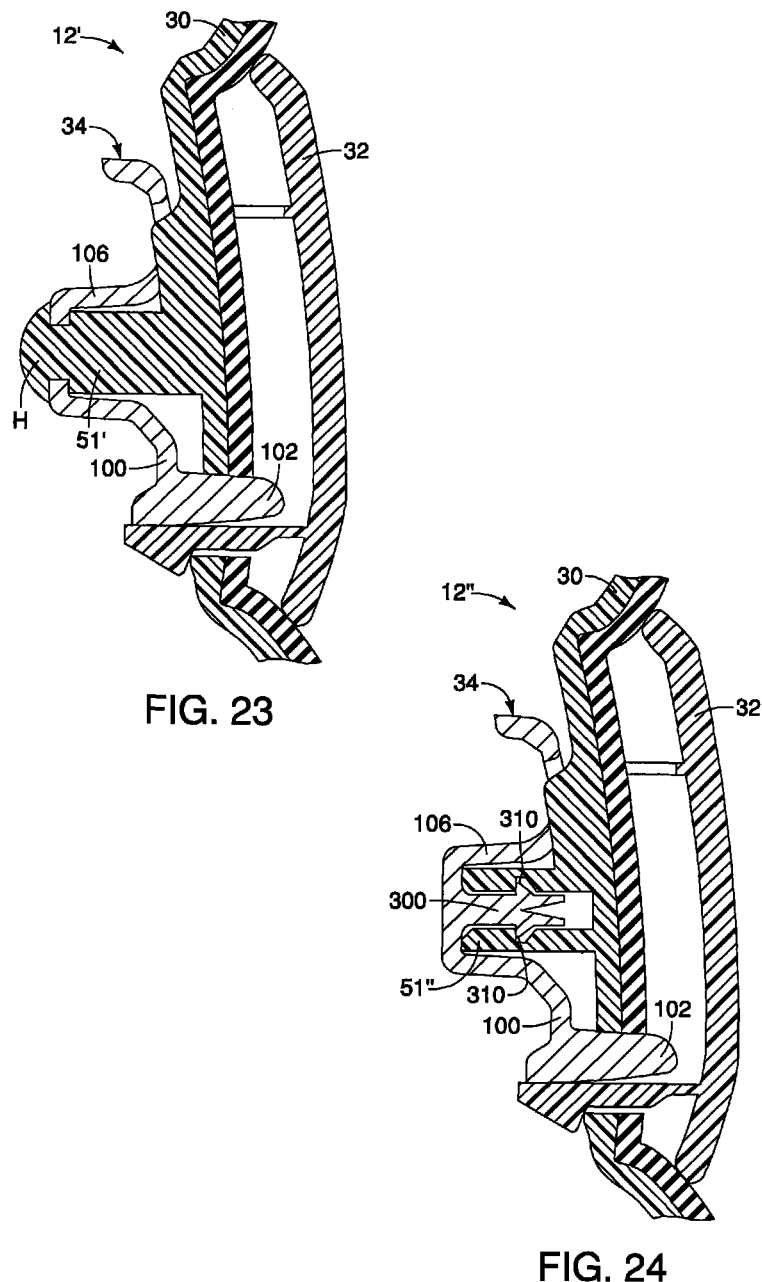
FIG. 23 is a cross-sectional view similar to FIG. 12, showing a retaining member attached to the first panel of a panel assembly by heat staking in accordance with a fourth embodiment.
FIG. 24 is a cross-sectional view similar to FIGS. 12 and 23, showing a retaining member attached to the first panel of a panel assembly by a snap-fitting arrangement in accordance with a fifth embodiment.

Referring now to FIG. 23, a panel assembly 12' in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the panel assembly 12' includes the first panel 30, the second panel 32 and the retaining element 34. However, in the fourth embodiment, an attachment post 51' of the first panel 30 is altered, as compared to the first embodiment, to include an extension H that is melted or heat staked after installation of the retaining element 34, thereby securing the retaining element 34 to the first panel 30. The extension H forms a semi-permanent attachment between the retaining element 34 and the first panel 30.

Fifth Embodiment

Referring now to FIG. 24, a panel assembly 12" in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the panel assembly 12" includes the first panel 30, the second panel 32 and the retaining element 34. However, in the fifth embodiment, the attachment post 51" of the first panel 30 is altered, as compared to the first embodiment, to include a pair of catch receiving notches 310. Further, the retaining element 34 is altered to include a snap-fitting member 300. When the retaining element 34 of the fifth embodiment is installed, the snap-fitting member 300 is inserted into the aperture of the attachment post 51" and catches on the catch receiving notches 310.

The various features of the vehicle door trim assembly 10 that are not described are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door trim assembly. Accordingly, these terms, as utilized to describe the present invention should be interpreted relative to a vehicle equipped with the vehicle door trim assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle panel assembly comprising:
a first panel having a first side and a second side with at least one aperture extending from the first side to the second side, the at least one aperture being defined by a first edge portion and a second edge portion facing the first edge portion;
a second panel overlying a portion of the first side of the first panel, the second panel including at least one snap-fitting member having a main portion and a catch portion, the main portion having a first side surface and a second side surface, the catch portion extending from the second side surface, the second side surface being opposite the first side surface, the at least one snap-fitting member extending through the at least one aperture such that the catch portion contacts an area of the second side adjacent to the first edge of the at least one aperture and the second side surface extends along the first edge of the aperture; and
a retaining element including at least one restricting part that extends from the second side of the first panel into the at least one aperture between the first side surface of the at least one snap-fitting projection and the second edge of the aperture to restrict movement of the snap-fitting member and inhibit disengagement of the snap-fitting member with the area of the second side adjacent to the at least one aperture.

2. The vehicle panel assembly according to claim 1, wherein
the at least one restricting part has a wedge shape.

3. The vehicle panel assembly according to claim 1, wherein
retaining element includes an attachment portion with the at least one restricting part extending therefrom, the attachment portion being attached to the second side of the first panel.

4. The vehicle panel assembly according to claim 3, wherein
the attachment portion is attached to the second side of the first panel by a removable fastener.

5. The vehicle panel assembly according to claim 4, wherein
the attachment portion includes a cylindrically shaped boss with a fastener receiving aperture, the removable fastener extending through the fastener receiving aperture.

6. The vehicle panel assembly according to claim 3, wherein
the attachment portion is attached to the second side of the first panel by heat staking attachment.

7. The vehicle panel assembly according to claim 3, wherein
the attachment portion is attached to the second side of the first panel by a second snap-fitting member.

8. The vehicle panel assembly according to claim 3, wherein
the at least one restricting part extends in a direction perpendicular to the attachment portion of the retaining element.

9. The vehicle panel assembly according to claim 1, wherein
the second panel includes a first alignment member adjacent to the at least one snap-fitting member, with the first alignment member and the at least one snap-fitting member engaging oppositely facing surfaces of the at least one aperture.

10. The vehicle panel assembly according to claim 9, wherein
the at least one restricting part restricts movement of the at least one snap-fitting member relative to the first panel in a first direction, and
the first alignment projection restricts movement of the at least one snap-fitting member relative to the first panel in a second direction perpendicular to the first direction.

11. The vehicle panel assembly according to claim 1, wherein
the main portion includes a rib that extends along the first side surface and perpendicular to the first side surface.

12. The vehicle panel assembly according to claim 11, wherein
the at least one restricting part includes a first wedge portion, a second wedge portion and a mid-portion between the first and second wedge portions defining a recess, and
the rib extends into the recess.

13. The vehicle panel assembly according to claim 12, wherein
the mid-portion has a tapering thickness as viewed in cross-section.

14. The vehicle panel assembly according to claim 1, wherein
the at least one restricting part comprises a first restricting part and a second restricting part spaced apart from the first restricting part.

15. The vehicle panel assembly according to claim 1, further comprising
a second retaining element including a second restricting part, wherein
the first panel includes a second aperture extending from the first side to the second side, the second panel includes a second snap fitting member extending through the second aperture and contacting an area of the second side adjacent to the second aperture, and the second restricting part extends from the second side of the first panel into the second aperture of the first panel to restrict movement of the second snap-fitting member and inhibit disengagement of the snap-fitting member with the area of the second side adjacent to the second aperture.

16. The vehicle panel assembly according to claim 1, wherein
the at least one aperture of the first panel comprises a first aperture and a second aperture;
the at least one snap-fitting member of the second panel comprises a first snap-fitting member extending through the first aperture and a second snap-fitting member extending through the second aperture; and
the at least one restricting part of the retaining element comprises a first restricting part and a second restricting part, the first restricting part extending into the first aperture to restrict movement of the first snap-fitting member and the second restricting part extending into the second aperture to restrict movement of the second snap-fitting member.

17. A vehicle panel assembly comprising:
a first panel having a first side and a second side with at least one aperture extending from the first side to the second side;
a second panel overlying a portion of the first side of the first panel, the second panel including at least one snap-fitting member extending through the at least one aperture and contacting an area of the second side adjacent to the at least one aperture; and
a retaining element including a main body having a surface extending in a lengthwise direction of the main body and at least one restricting part protruding from the surface of the main body such that the at least one restricting part extends into the at least one aperture to restrict movement of the snap-fitting member inhibiting disengagement of the snap-fitting member with the area of the second side adjacent to the at least one aperture, the main body being located along the second side of the first panel with the surface of the main body overlying a portion of the second side of the first panel that is spaced apart from the at least one aperture with the retaining element and the second panel fixedly attached to the first panel.

18. The vehicle panel assembly according to claim 17, wherein
the main body of the retaining element includes an attachment portion is fixedly attached to the second side of the first panel.

19. The vehicle panel assembly according to claim 17, wherein
the main body of the retaining element extends in a first direction along the portion of the second side of the first panel, and
the at least one restricting part extends in a direction that is transverse to the first direction.

20. The vehicle panel assembly according to claim 17, wherein
the surface of the main body of the retaining element extends along the portion of the second side of the first panel, and
the at least one restricting part extends in a direction that is perpendicular to the surface of the main body.

* * * * *